US012512192B2

(12) United States Patent
Blechman

(10) Patent No.: US 12,512,192 B2
(45) Date of Patent: Dec. 30, 2025

(54) DIGITAL HEALTH PRIVACY PLATFORM AND PASSPORT

(71) Applicant: Prosocial Applications, Inc., Boulder, CO (US)

(72) Inventor: Elaine Blechman, Boulder, CO (US)

(73) Assignee: PROSOCIAL APPLICATIONS, INC., Boulder, CO (US)

( * ) Notice: Subject to any disclaimer, the term of this patent is extended or adjusted under 35 U.S.C. 154(b) by 343 days.

(21) Appl. No.: 18/046,130

(22) Filed: Oct. 12, 2022

(65) Prior Publication Data

US 2023/0317221 A1 Oct. 5, 2023

Related U.S. Application Data

(60) Provisional application No. 63/325,361, filed on Mar. 30, 2022.

(51) Int. Cl.
*G16H 10/60* (2018.01)
*H04L 9/40* (2022.01)

(52) U.S. Cl.
CPC .......... *G16H 10/60* (2018.01); *H04L 63/107* (2013.01)

(58) Field of Classification Search
CPC ........ G16H 10/60; G16H 10/65; G16H 15/00; H04L 63/08; H04L 63/0861; H04L 63/083; H04L 63/0853; H04L 63/107
See application file for complete search history.

(56) References Cited

U.S. PATENT DOCUMENTS

| | | | | |
|---|---|---|---|---|
| 10,417,627 | B2 * | 9/2019 | Dibiasi | G06Q 40/08 |
| 11,443,838 | B1 * | 9/2022 | Cordonnier | G16H 10/20 |
| 2010/0306828 | A1 * | 12/2010 | Grob | G06F 21/31 726/4 |
| 2018/0039737 | A1 * | 2/2018 | Dempers | G06F 21/35 |
| 2019/0208354 | A1 * | 7/2019 | Raduchel | G06F 21/6245 |
| 2020/0258605 | A1 * | 8/2020 | Blechman | G16H 40/67 |
| 2021/0075623 | A1 * | 3/2021 | Petersen | G06Q 20/401 |
| 2022/0040557 | A1 * | 2/2022 | Tran | G06F 1/163 |
| 2022/0172808 | A1 * | 6/2022 | Selvaggi | G16H 10/60 |
| 2022/0245637 | A1 * | 8/2022 | Gnanasambandam | G16H 40/20 |
| 2023/0108369 | A1 * | 4/2023 | Bachoura | G06Q 20/102 705/50 |

* cited by examiner

*Primary Examiner* — Boris D Grijalva Lobos
(74) *Attorney, Agent, or Firm* — Holzer Patel Drennan

(57) ABSTRACT

The technology disclosed herein provides a digital health privacy platform (Platform) and digital health passport (Passport) that together equip consumers to avoid unauthorized surveillance as they engage with their many authorized and variously located healthcare providers in information exchange and transactions for healthcare goods and services across episodes of care for diverse health problems while managing health-related self-maintenance, legal and financial matters.

18 Claims, 14 Drawing Sheets

DIGITAL HEALTH PRIVACY PLATFORM AND PASSPORT

CROSS-REFERENCE TO RELATED APPLICATIONS

This patent application is a non-provisional patent application based on U.S. provisional patent application Ser. No. 63/325,361 filed on Mar. 30, 2022, which is incorporated by reference herein in its entirety.

FIELD

Implementations disclosed herein relate, in general, to information management technology and specifically to health records management systems.

SUMMARY

The technology disclosed herein provides a digital health privacy platform (Platform) and digital health passport (Passport) that together equip consumers to avoid unauthorized surveillance as they engage with their many authorized and variously located healthcare providers in information exchange and transactions for healthcare goods and services across episodes of care for diverse health problems while managing health-related self-maintenance, legal and financial matters. In one implementation of the Platform, consumers create longitudinal consumer-owned records (CORs) continuously populated with personally identifiable contents of their many providers' electronic health record systems (EHRs), and continuously transformed into deidentified, distributed nonfungible tokens on a hyperledger (COR-NFTs). As used herein, the term longitudinal record means a single comprehensive patient record comprised of data from numerous data sources across the healthcare continuum. For example, a longitudinal record may include electronic medical records of patient health information generated by one or more encounters in any care delivery setting.

In a second implementation, the Platform enables consumers to search a nationwide directory of licensed healthcare providers, communicating directly with selected providers to order, schedule, fulfill and purchase goods and services, such as pharmaceuticals and telehealth consultations, that match their specifications, without unauthorized surveillance. In a third implementation, consumers employ Passports comprising wireless communication tags embodied, for example, as mobile or web applications or as microchipped credit cards to conduct health-related information exchange and transactions on the Platform, without unauthorized surveillance. In a fourth implementation, the Platform nudges consumers when privacy threat levels are measurably low to use their Passports to share relevant contents of their personally identifiable CORs with providers; and when privacy threat levels are measurably high, to share relevant deidentified COR-NFTs with providers. In a fifth implementation, the Platform acts as an interoperability gateway between their CORs and selected providers' EHRs, enabling consumers to differentially authorize the exchange of treatment-relevant contents of their CORs with EHRs, while preventing authorized or unauthorized wholesale exchange of treatment-irrelevant transactions, data content or metadata. In a sixth implementation, Platform algorithms broker smart contracts between consumers with rare diseases and valuable anonymized data, such as genomic profiles, stored in distributed hyperledger nodes as nonfungible tokens (COR-NFTs) and enterprises, such as pharmaceutical companies, eager to lease COR-NFTs for research purposes. In a seventh implementation, the Platform enables publicly funded providers, such as federally qualified health centers, rural critical access hospitals, and hospital emergency departments to coordinate acute care and long-term follow-up of patients with providers in other organizations and locations, who are subject to disparate care-delivery and funding regulations, without unauthorized surveillance. In an eight implementation, a self-insured employer provisions employees with corporate digital health passports in the form of microchipped credit cards enabling them to coordinate their acute care and long-term follow-up with providers in various organizations and locations, who are subject to disparate care-delivery and funding regulations, without unauthorized surveillance. In another implementation, the digital health passport comprises a point-of-care decision-support algorithm that deconflicts health-related government regulations and health plan benefits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
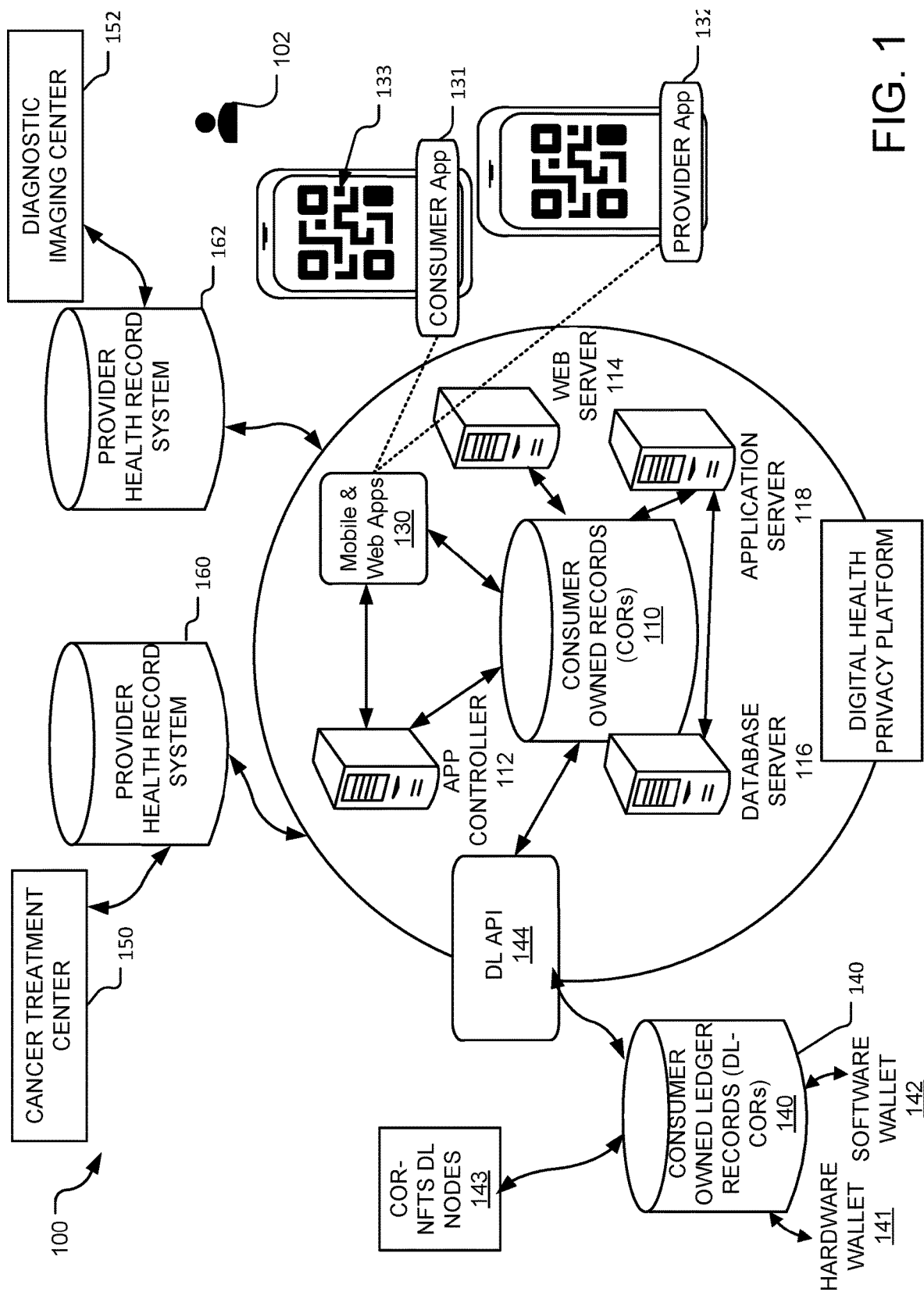
FIG. 1 illustrates a block diagram representing an example digital health privacy platform deployment structure disclosed herein.

The technology disclosed herein provides a digital health privacy platform (Platform) and digital health passport (Passport) that together equip consumers to avoid unauthorized surveillance as they engage with their many authorized and variously located healthcare providers in information exchange and transactions for healthcare goods and services across episodes of care for diverse health problems while managing health-related self-maintenance, legal and financial matters. In one implementation of the Platform, consumers create longitudinal consumer-owned records (CORs) continuously populated with personally identifiable contents of their many providers' electronic health record systems (EHRs), and continuously transformed into deidentified, distributed nonfungible tokens on a hyperledger (COR-NFTs). In a second implementation, the Platform enables consumers to search a nationwide directory of licensed healthcare providers, communicating directly with selected providers to order, schedule, fulfill and purchase goods and services, such as pharmaceuticals and telehealth consultations that match their specifications, without unauthorized surveillance. In a third implementation, consumers employ Passports comprising wireless communication tags embodied, for example, as mobile or web applications or as microchipped credit cards to conduct health-related information exchange and transactions on the Platform, without unauthorized surveillance. In a fourth implementation, the Platform nudges consumers when privacy threat levels are measurably low to use their Passports to share relevant contents of their personally identifiable CORs with providers; and when privacy threat levels are measurably high, to share relevant deidentified COR-NFTs with providers. In a fifth implementation, the Platform acts as an interoperability gateway between their CORS and selected providers' EHRs, enabling consumers to differentially authorize the exchange of treatment-relevant contents of their CORS with EHRs, while preventing authorized or unauthorized wholesale exchange of treatment-irrelevant transactions, data content or metadata. In a sixth implementation, Platform algorithms broker smart contracts between consumers with rare diseases and valuable anonymized data, such as genomic profiles, stored in distributed hyperledger nodes as nonfungible tokens (COR-NFTs) and enterprises, such as pharmaceutical companies, eager to lease COR-NFTs for research purposes. In a seventh implementation, the Platform enables publicly funded providers, such as federally qualified health centers, rural critical access hospitals, and hospital emergency departments to coordinate acute care and long-term follow-up of patients with providers in other organizations and locations, who are subject to disparate care-delivery and funding regulations, without unauthorized surveillance. In an eighth implementation, a self-insured employer provisions employees with corporate digital health passports in the form of microchipped credit cards enabling them to coordinate their acute care and long-term follow-up with providers in various organizations and locations, who are subject to disparate care-delivery and funding regulations, without unauthorized surveillance. In another implementation, the digital health passport comprises a point-of-care decision-support algorithm that deconflicts health-related government regulations and health plan benefits.

FIG. 1 illustrates a block diagram representing an example digital health privacy platform (Platform) 100 deployed on encrypted cloud servers comprising a database of consumer-owned records (CORs) 110, an application controller 112, a web server 114, a database server 116, and an application server 118 equipping a consumer 102 to create a personally identifiable, longitudinal consumer-owned record (CORs) 110 populated with tamper-proof content captured from many sources including electronic health record systems (EHRs) 160, 162 of healthcare providers 150, 152. The Platform 100 transforms the personally identifiable comprehensive CORs 110 into deidentified, distributed consumer-owned ledger records DL-CORs 140 by deidentifying, decomposing, and distributing contents of the DL-CORs 140 as nonfungible tokens (COR-NFTs) 143 stored in the many nodes of the distributed hyperledger (DL) 140 interacting with the Platform 100 via DL API 144. The Platform 100 also controls access to the CORs 110 and to COR-NFTs 143 via QR and other wireless communication codes 133 with embodiments including mobile and web apps 130, 131, 132 software wallet 142 and hardware wallet 141.

Figure 2:
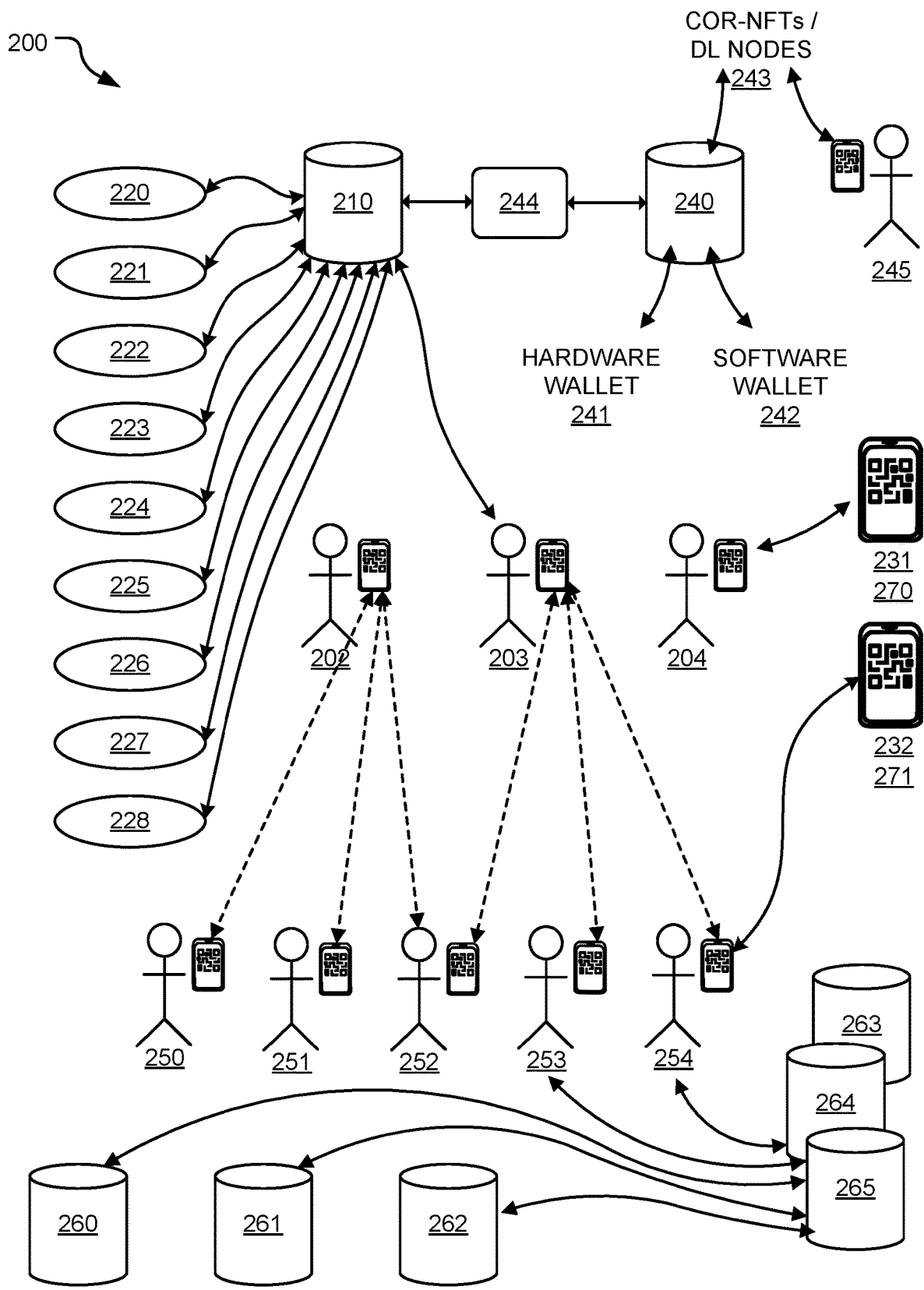
FIG. 2 illustrates a block diagram representing an example of digital health privacy platform and digital health passport functional performance disclosed herein.

FIG. 2 illustrates an example block diagram 200 of digital health privacy platform (Platform) (as shown in FIG. 1) functional performance. Specifically, FIG. 2 illustrates how a database of personally identifiable consumer-owned cloud records (CORs) 210 running blockchain analytic, care coordination, decision support, identity verification, interoperability, permissions, regulatory, telehealth and threat defense algorithms (220, 221, 222, 223, 224, 225, 226, 227, 228) interacting via DL API 244 with distributed, deidentified consumer-owned ledger records (DL) 240, equips patient 202, family caregiver 203, caregiver successor 204 to avoid unauthorized surveillance as they engage with primary care provider 250, diagnostic imaging specialist 251, cancer treatment specialist 252, and community health center 253 in information exchange and transactions for healthcare goods and services across episodes of care for diverse health problems while managing health-related self-maintenance, legal and financial matters without unauthorized surveillance.

FIG. 2 illustrates an implementation in which the digital health privacy platform (Platform) 200 running blockchain analytic, care coordination, decision support, identity verification, interoperability, permissions, regulatory, telehealth and threat defense algorithms (220, 221, 222, 223, 224, 225, 226, 227, 228) equips consumers 202, 203, 204, to use mobile or web apps 231 to create longitudinal consumer-owned cloud records (CORs) 210 continuously populated with personally identifiable contents of their many providers' electronic health record systems 260, 261, 262 and continuously transformed into deidentified, distributed non-fungible tokens on hyperledger (COR-NFTs) 243 without unauthorized surveillance.

FIG. 2 illustrates a second implementation in which the digital health privacy platform (Platform) 200 running care coordination 221, decision support 222, identity verification 223, permissions 225, regulatory 226, telehealth 227, and threat defense 228 algorithms equips consumers 202, 203, 204, to prevent unauthorized surveillance as they use their mobile and web apps 231, 232 to search a nationwide directory of licensed healthcare providers, communicate directly with selected providers 250, 251, 252, 253 to order, schedule, fulfill and purchase goods and services, such as pharmaceuticals and telehealth consultations that match their requirements.

FIG. 2 illustrates a third implementation of the digital health privacy platform 200, in which a consumer 204 employs a digital health passport (Passport) comprising a wireless communication tag 270, which might be embodied as a mobile application 231, to share an MRI received from a diagnostic imaging specialist 251 with a cancer treatment specialist 252, without unauthorized surveillance.

FIG. 2 illustrates a fourth implementation of the digital health privacy platform (Platform) 200 running blockchain analytic 220, decision support 222, identity verification 223, permissions 225 and threat defense algorithm 228, nudging consumers 202, 203, 204 when privacy threat levels are measurably low to use their digital health passport (Passport) comprising a wireless communication tag 270 to share relevant contents of their personally identifiable CORs 210 with providers; and when privacy threat levels are measurably high, to share relevant deidentified COR-NFTs 243 with providers 250, 251, 252, 253 without unauthorized surveillance.

FIG. 2 illustrates a fifth implementation in which the digital health privacy platform (Platform) 200 running identity verification 223, interoperability 224, permissions 225, regulatory 226, and threat defense 228 algorithms acts as an interoperability gateway between consumer-owned health records CORs 210 and external provider-owned electronic health record systems (EHRs) 260, 261, 262 equipping consumers to differentially authorize the exchange of treatment-relevant contents of their CORs 210 with those EHRs 260, 261, 262, while preventing authorized or unauthorized wholesale exchange of treatment-irrelevant transactions, data content or metadata.

FIG. 2 illustrates a sixth implementation in which the digital health privacy platform (Platform) 200 running blockchain analytic 220, decision support 222, identity verification 223, interoperability 224, permissions 225, regulatory 226, and threat defense 228 algorithms, brokers smart contracts between consumers 202, 203, 204 with rare diseases and valuable anonymized data, such as genomic profiles, stored in distributed hyperledger nodes as nonfungible tokens COR-NFTs 243 and enterprises, such as pharmaceutical companies, eager to lease COR-NFTs for research purposes, without unauthorized surveillance.

FIG. 2 illustrates a seventh implementation in which the digital health privacy platform (Platform) 200 running blockchain analytic 220, care coordination 221, decision support 222, identity verification 223, interoperability 224, permissions 225, regulatory 226, telehealth 227 and threat defense 228 algorithms enables publicly funded providers, such as federally qualified community health centers 253 to coordinate acute care and long-term follow-up of patients 202, 203, 204 with many providers 250-254 and health plans 263, 264, 265 each subject to unique care-delivery and funding regulations, without unauthorized surveillance.

FIG. 2 illustrates an implementation in which a self-insured employer 254 provisions an employee 202 with a corporate digital health passport in the form of a microchipped credit card 271 enabling them to coordinate their acute care and long-term follow-up with many providers 250, 251, 252 and health plans 263, 264, 265 each subject to unique care-delivery and funding regulations, without unauthorized surveillance.

FIG. 2 illustrates an additional implementation in which the digital health passport (Passport) 270 comprises point-of-care decision support 222 and regulatory 226 algorithms that deconflict health-related government regulations and health plan benefits enabling the community health center 253 to supply medically necessary, data-driven, gold-standard services and products to a patient 202 and to code and otherwise document the reason for such services and products as needed for administrative and reimbursement purposes, without unauthorized surveillance.

Figure 3:
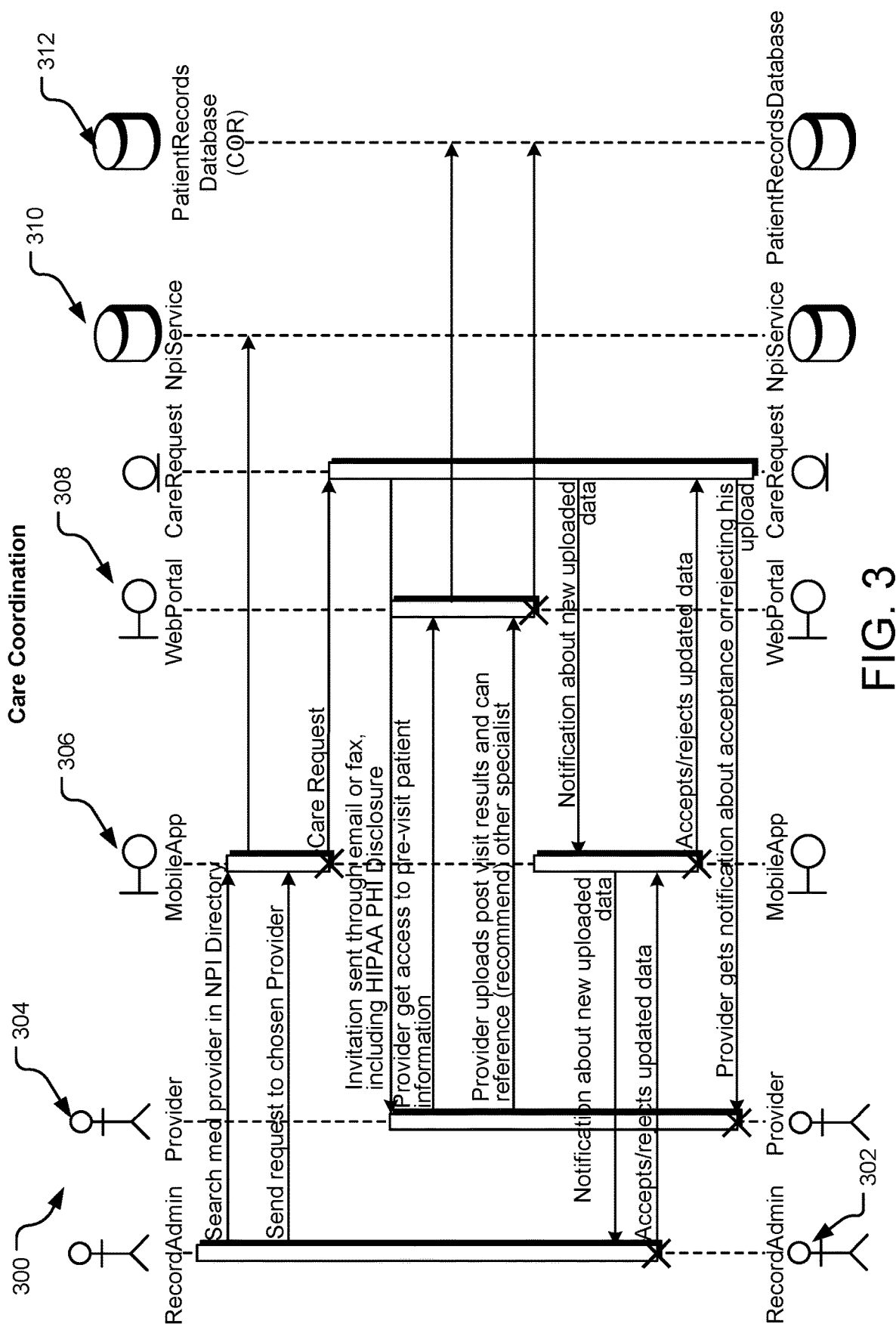
FIG. 3 illustrates an example sequence diagram of operations for using the digital health platform and digital health passport for care coordination disclosed herein.

FIG. 3 illustrates an example sequence diagram 300 of operations for consumers, acting as record administrator 302 for their own and family members' Consumer-Owned Records (CORs) 312, and using digital health platform (Platform) tools including mobile and web apps 306, 308 to coordinate patient care across healthcare providers in different professional specialties, organizations, locations, and jurisdictions by actions including searching for an identity-verified healthcare provider 304 who fits patient requirements in a nationwide registry of licensed providers (NPI Service) 310; sending a consultation request for care to a selected provider including legal documents such as a consent to HIPAA PHI disclosure; enabling a selected provider via an encrypted, two-factor authenticated web portal 308 to view pre-consult information in the patient's COR 312 and to upload post-consult results to the web portal 308 including referrals to other providers, which the record administrator 302 may contact via the NPI Service 310; enabling the Record Administrator 302 to review (but not tamper with) uploaded results, accepting tamper-proof results into the patient's COR 312 ("this report has my name on it and describes the recommendations this provider made to me") or rejecting results ("this report has someone else's name on it and describes recommendations this provider never made to me") and requesting a replacement; when uploaded results are accepted, supplying the Provider 304 with documentation of compliance with patient information requests under HIPAA, 21$^{st}$ Century Cures Act and other applicable regulations; enabling the Provider 304 to export pre- and post-consult data to their external electronic health record system (EHR) or for their own protection to use the web portal 308 for repeated, future access to the patient's COR 312; all without unauthorized surveillance.

Figure 4:
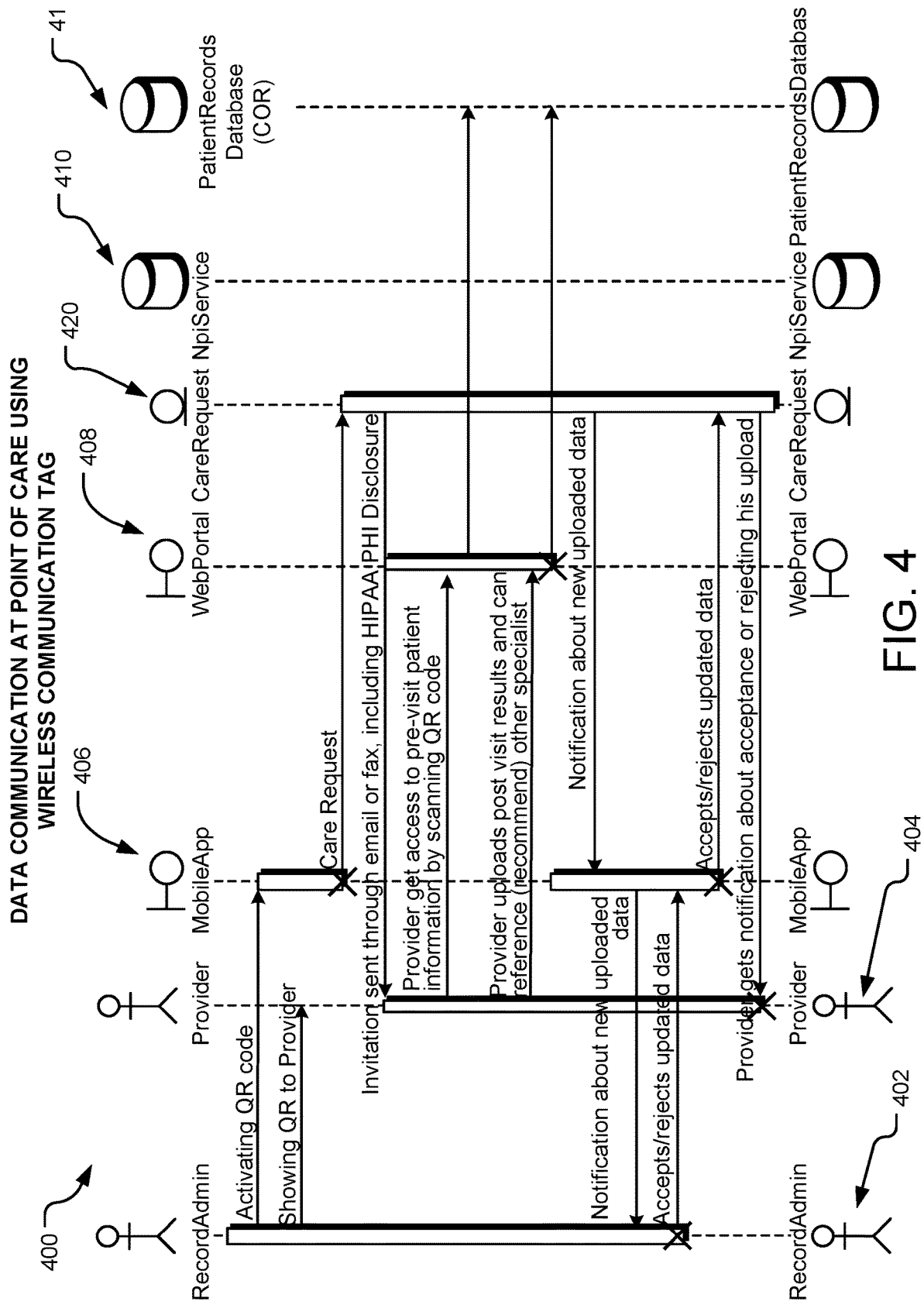
FIG. 4 illustrates an example sequence diagram of operations for using the digital health privacy platform and digital health passport for health information exchange at point of care disclosed herein.

FIG. 4 illustrates an example sequence diagram 400 of operations for consumers, acting as Record Administrator 402 for their own and family members' Consumer-Owned Records (CORs) 412, employing a digital health passport (Passport) with a wireless communication tag such as a QR code (also referred to as a wirelessly scannable code), embodied as a mobile application 406, to share an MRI uploaded earlier by a diagnostic imaging specialist to the patient's CORs 412, with an oncology Provider 404, who might scan the Passport QR code on the Record Administrator's mobile app 406 at a consultation, gaining access to the MRI via an encrypted, two-factor authenticated web portal 408 to the COR 412, and later uploading follow-up recommendations to the web portal 408, including referrals to other specialists who the Record Administrator 402 may contact via the NPI Service 410, all without unauthorized surveillance.

Furthermore, the sequence diagram 400 also provides for distributed storage in a private Hyperledger of the anonymized immutable contents of each COR. Record Administrator 402 exclusively controls the private key and smart contracts with individual and organizational providers consumer-authorized for one-time or continuing access to all or selected COR contents. Also, the sequence diagram 400 provides for usage of third-party apps (for sensitive self-reported and device-collected data, such as menstrual cycle trackers) within the Digital Health Privacy Platform, with resulting data stored in CORs and shared with consumer-authorized providers. Finally, the sequence diagram 400 also illustrates geofencing of the wireless communication tag, so that in certain locations, when the wireless communication tag is scanned, an automatic notification is sent to a remote Record Administrator about the scanner's location, the COR is automatically deleted from Platform databases, and all of the above occur without unauthorized surveillance.

Figure 5:
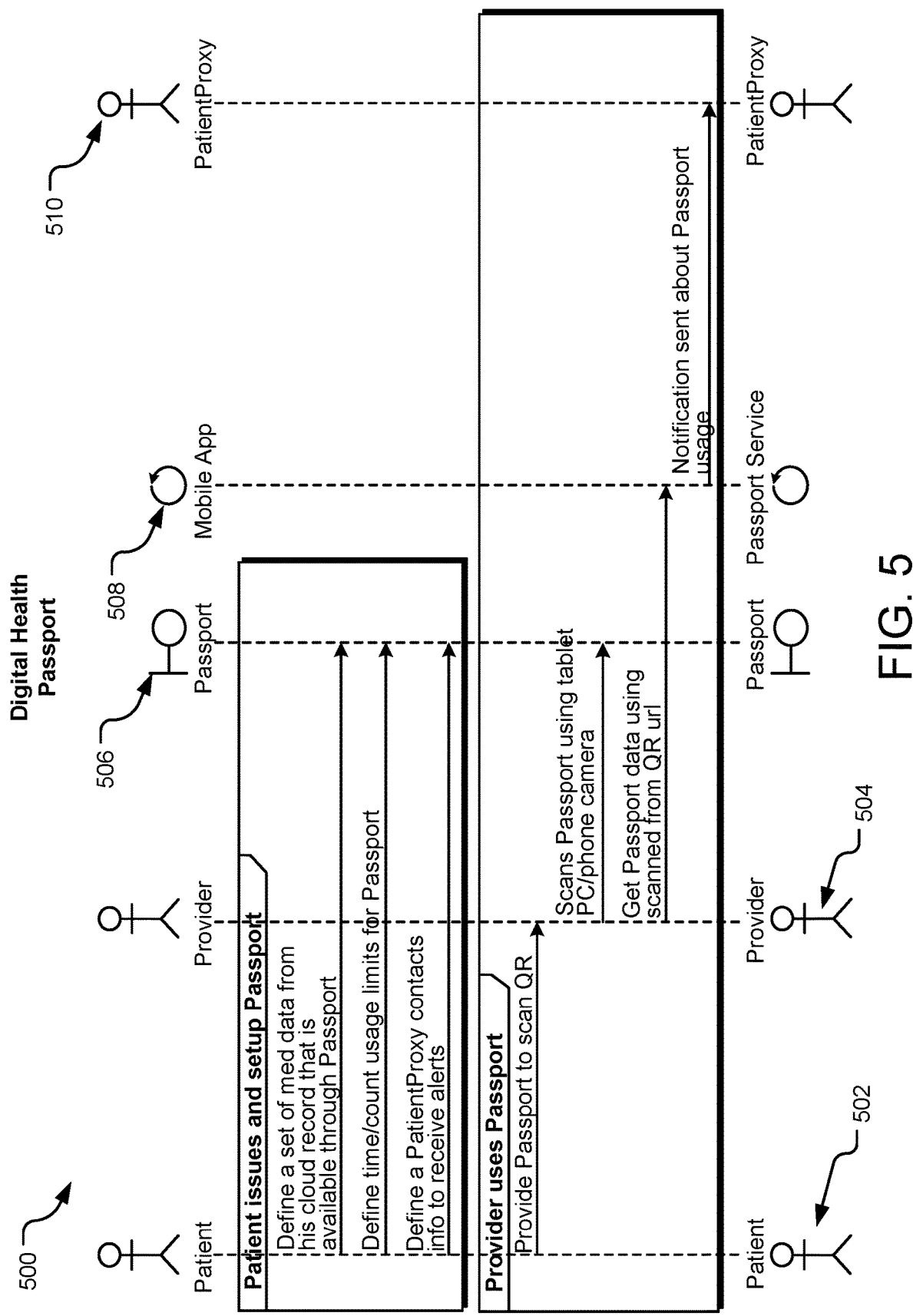
FIG. 5 illustrates an example sequence diagram of operations for patient setup and provider use of digital health passport with wireless communication tag disclosed herein.

FIG. 5 illustrates an example sequence 500 diagram of operations for a Patient 502, to activate a digital health passport with a wireless communication tag, embodied as a microchipped credit card (Passport Card) 506 via a Mobile App 508, authorizing data sharing at point of care by a Provider 504 who scans the code on the Passport Card 506 or inserts it into a credit card terminal, without unauthorized surveillance.

The sequence diagram 500 in FIG. 5 also illustrates various other operations between a Patient 502, a Provider 504, a Passport Card 506, a Mobile App 508, and a Patient Proxy 510 for using a Passport Card 506, without unauthorized surveillance.

Figure 6:
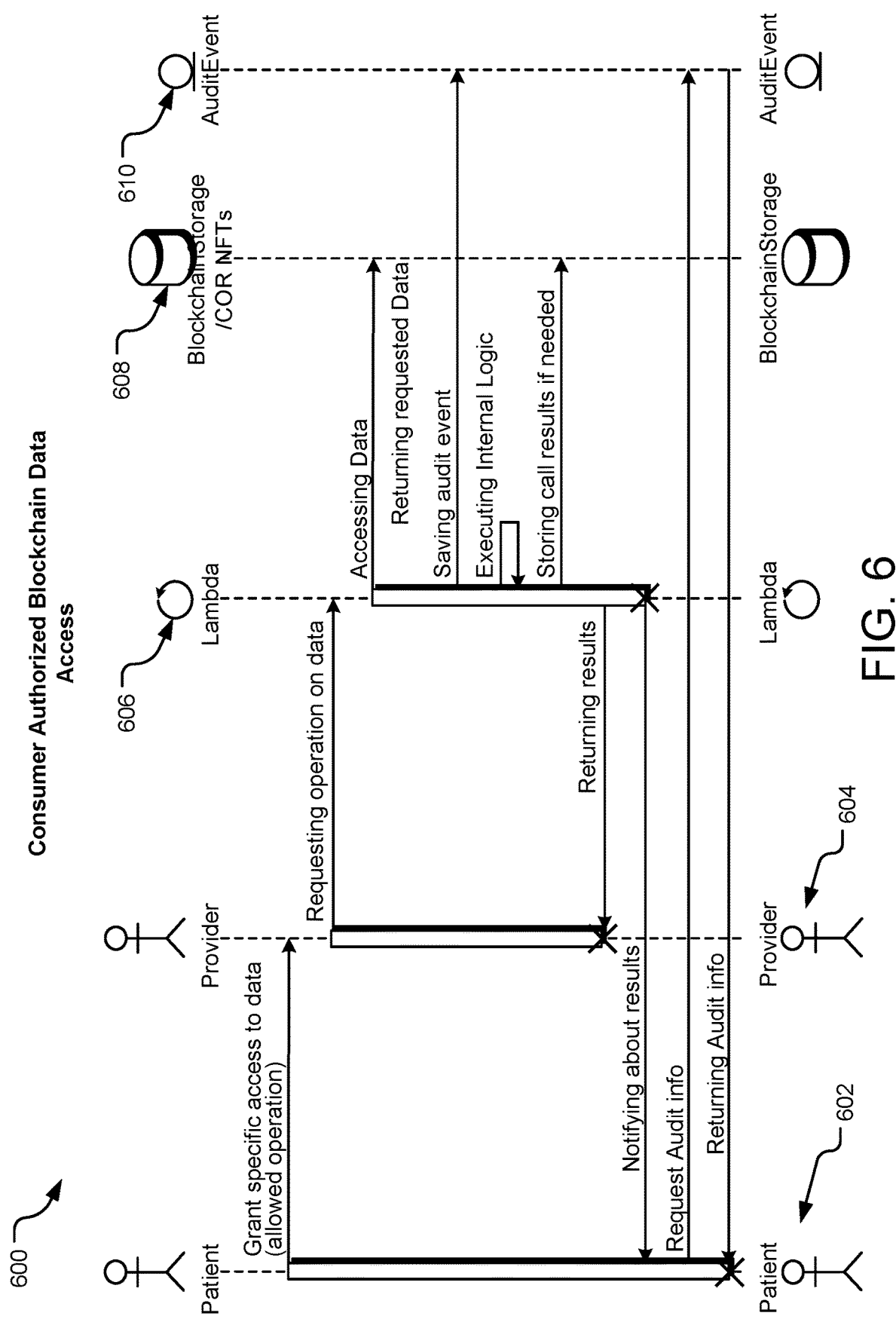
FIG. 6 illustrates an example sequence diagram of operations for patient-authorized storage and retrieval of deidentified patient data stored as nonfungible tokens (NFTs) on blockchain nodes disclosed herein.

FIG. 6 illustrates an example sequence diagram 600 of operations for the digital health passport (Passport) with wireless communication tag 270 (shown in FIG. 2) which, in various embodiments, when privacy threat levels are measurably low nudges the Patient 602 to share relevant contents of their personally identifiable consumer-owned Record (COR) with a Provider 604; and when privacy threat levels are measurably high, to share relevant deidentified COR-NFTs in Blockchain Storage 608 with Provider 604. In various implementations, all of the above occur without unauthorized surveillance.

Also as illustrated in FIG. 6, the Passport brokers smart contracts between a patient 602 with a rare disease and valuable anonymized data, such as genomic profiles, stored in distributed Hyperledger nodes as nonfungible tokens COR-NFTs and enterprises, such as pharmaceutical companies, eager to lease COR-NFTs for research purposes, which do not require the patient 602 to relinquish ownership and exclusive control of, past, current, and future deidentified COR-NFTs. Furthermore, the Passport brokers smart contracts between a patient 602, their self-insured employers and healthcare providers, enabling just-in-time need-to-know patient-authorized access to identified Consumer-Owned Record (COR) contents or to deidentified COR NFTs without import into external electronic health record systems (EHRs), protecting Patient 602 and Provider 604 alike. In the illustrated implementations, all of the above occur without unauthorized surveillance.

The sequence diagram 600 also illustrates various other operations of the Passport between a Patient 602, a Provider 604, Blockchain Storage 608, and a lambda function 606 that generates an audit event transaction 610, without unauthorized surveillance.

Figure 7:
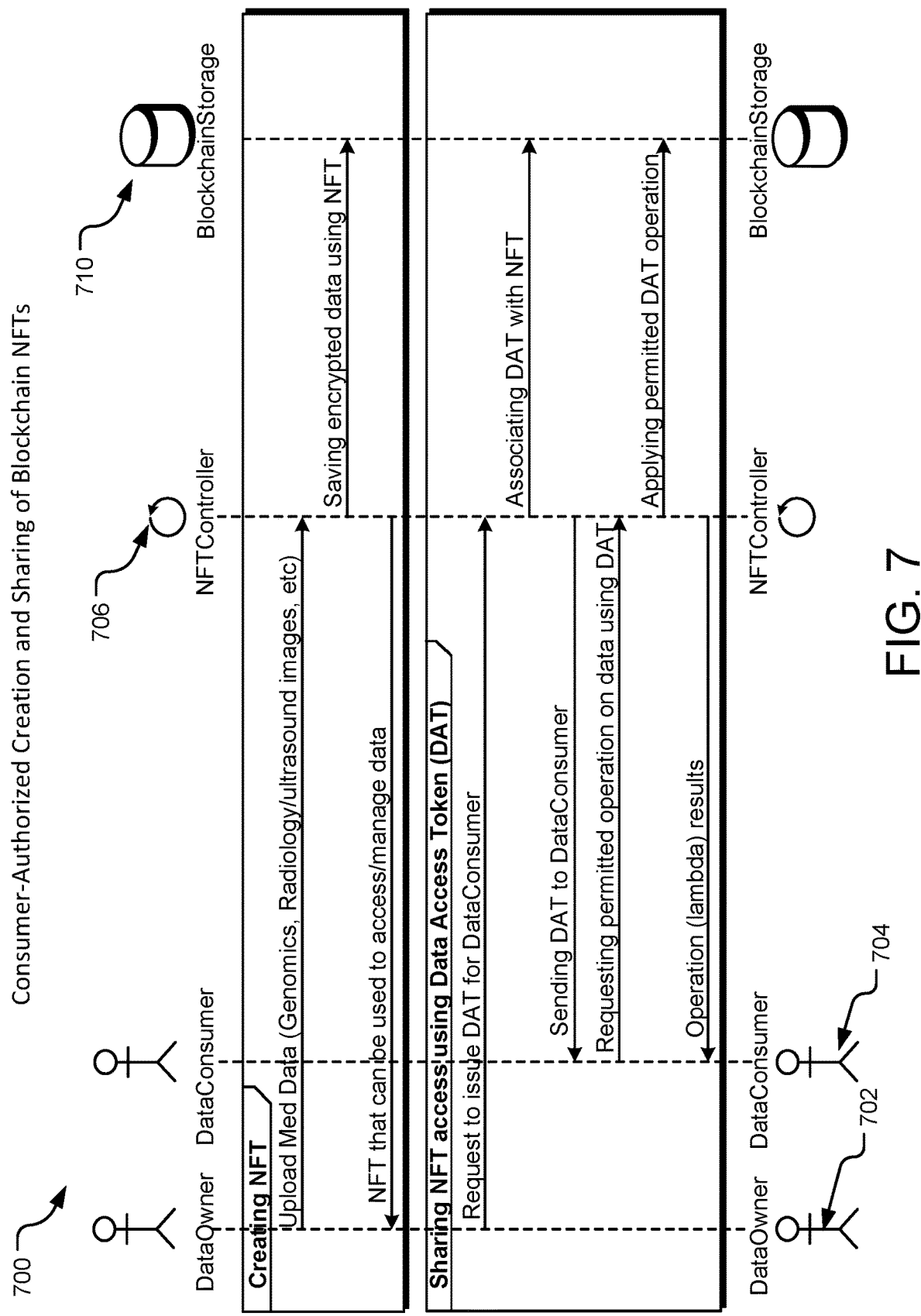
FIG. 7 illustrates an example sequence diagram of operations for creating, storing, and sharing deidentified patient data as nonfungible tokens (NFTs) on blockchain nodes disclosed herein.

FIG. 7 illustrates an example sequence diagram 700 of operations for a smart contract between a patient or Data Owner 702, with a rare disease and valuable anonymized data, such as genomic profiles and radiology images, stored in Blockchain nodes 710 as nonfungible tokens (COR-NFTs) and a Data Consumer 704 that leases these COR-NFTs for research purposes while the patient retains ownership and exclusive control of past, current, and future record contents, without unauthorized surveillance.

The sequence diagram 700 in FIG. 7 also illustrates various other operations between a Data Owner 702, a Data Consumer 704, an NFT controller 706, and Blockchain Storage 710, to create NFTs and to share NFT access using data access tokens (DATs), without unauthorized surveillance.

Figure 8:
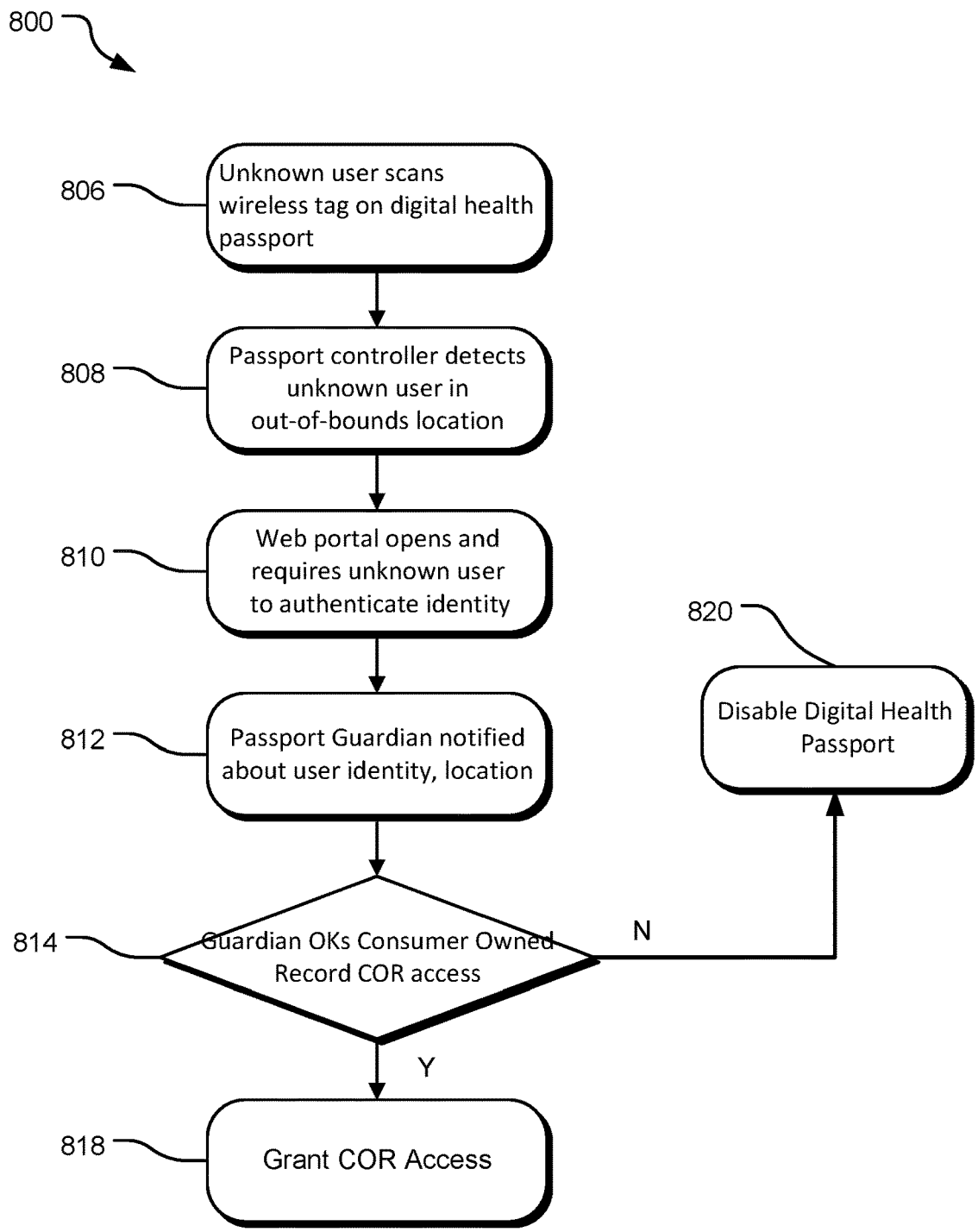
FIG. 8 illustrates example operations for disabling the digital health passport after an unauthorized scan as disclosed herein.

FIG. 8 illustrates example operations 800 of disabling the Digital Health Passport (Passport) after an unauthorized scan as disclosed herein. Specifically, the operations 800 also allows an unknown user to scan the wireless communication tag on a digital health passport (Passport), embodied as a mobile app 806 which, if the passport controller detects an unknown user in an out-of-bounds locations 808 opens a two-factor authenticated, encrypted, time-limited web portal on the scanning user's device, requesting proof of identity from the unknown user 810 and notifying a patient-authorized family member or friend, Record Administrator or other Passport Guardian with the authority to approve or deny the unknown user's access to the Consumer-Owned Record (COR) 812. Authorization denial disables the Passport 820 until reactivated by arrangements designated in advance by the patient and the Passport Guardian, while approval grants the user immediate access to the COR 818. And all of the above occur without unauthorized surveillance.

Figure 9:
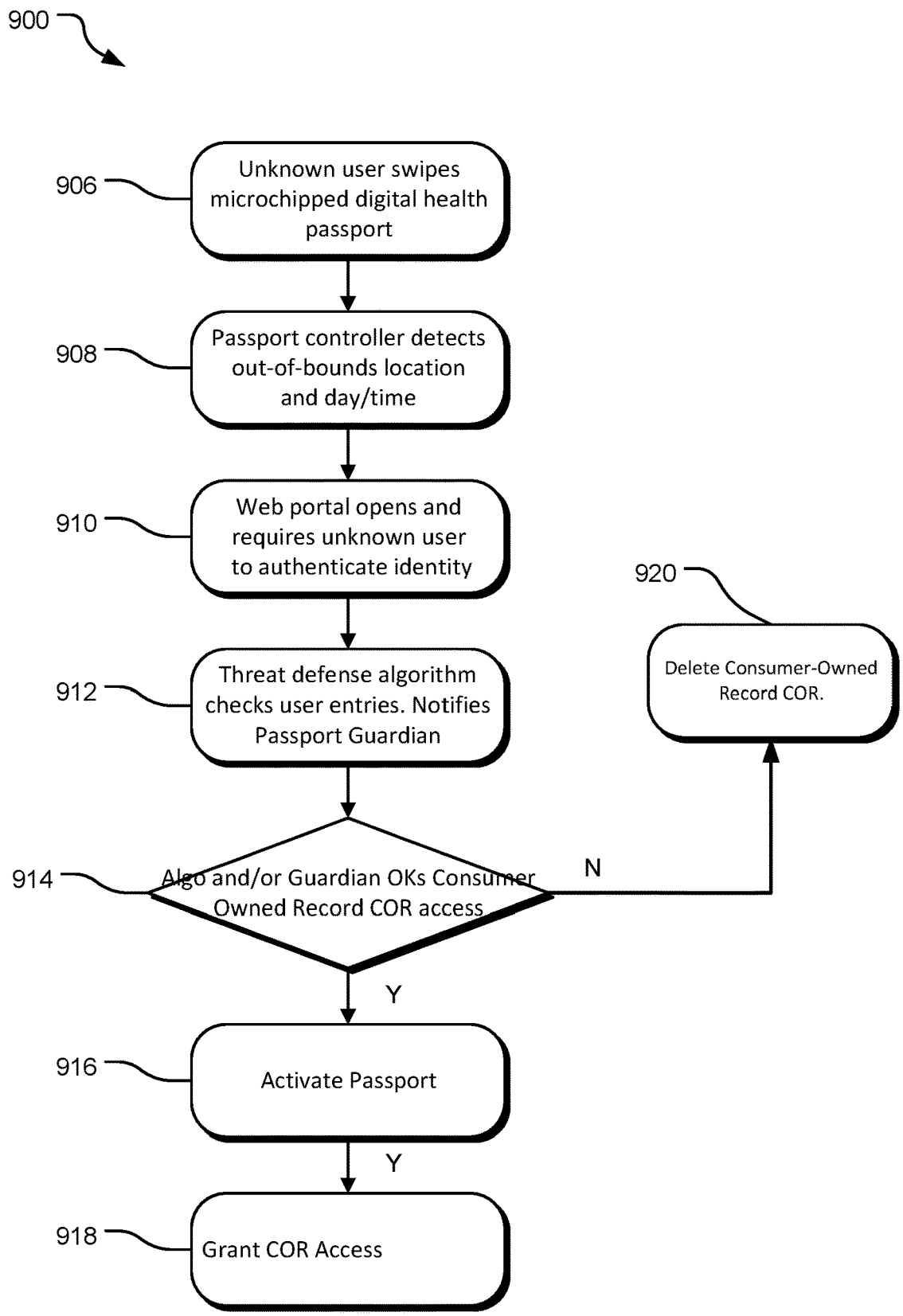
FIG. 9 illustrates alternative example operations for deleting the personally identifiable consumer-owned record after an unauthorized scan of the digital health passport as disclosed herein.

FIG. 9 illustrates alternative example operations 900 of deleting the personally identifiable Consumer-Owned Record (COR) after an unauthorized scan of the digital health passport as disclosed herein. Specifically, the operations 900 also allows an unknown user to swipe a digital health passport (Passport) with wireless communication tag, embodied as a microchipped credit card 906. If at operation 908, the passport controller detects that the card has been swiped at an out-of-bounds location or on an out-of-bounds day and time, operation 910 opens a two-factor authenticated, encrypted, time-limited web portal on the unknown user's device and requires the unknown user to authenticate identity and justify the out-of-bounds location, day, and time. In response, the threat defense algorithm checks user entries and notifies a patient-authorized family member or friend, Record Administrator, or other Passport Guardian about the results 912. If, in operation 914, the threat-defense algorithm and/or the Guardian approve access to the Consumer-Owned Record (COR), operation 916 continues Passport activation and operation 918 grants the user COR access. If, in operation 914, the algorithm and/or the Guardian deny COR access, operation 920 disables the Passport and deletes the COR from the production database. Given prior patient and/or Guardian authorization, COR deletion may automatically switch future Passport access to anonymized patient data stored in Blockchain nodes as nonfungible tokens (COR-NFTs). And all of the above occur without unauthorized surveillance.

Figure 10:
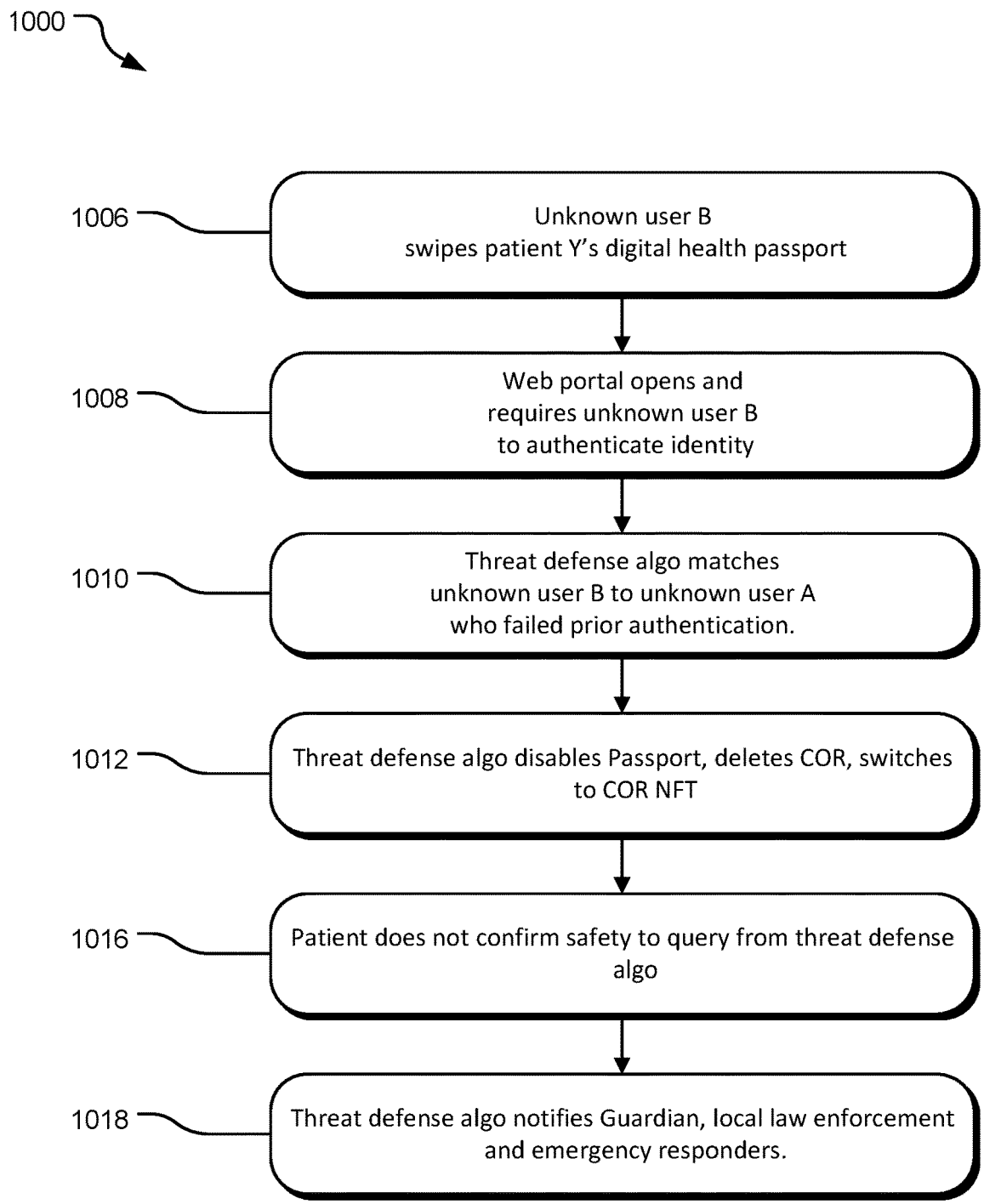
FIG. 10 illustrates alternative example operations of disabling digital health passport, deleting COR, and switching to COR NFT when patient safety is threatened, as disclosed herein.

FIG. 10 illustrates alternative example operations 1000 of the threat defense algorithm learning from experience to dispatch aid to patients, as disclosed herein. Specifically, the operations 1000 also allows an unknown user B to scan the wireless communication tag on patient Y's digital health passport (Passport) 1006. The resulting operation 1008, opens a web portal requiring unknown user B to authenticate their identity and qualifications for access to the patient's identifiable Consumer-Owned Record (COR) or deidentified Blockchain nonfungible tokens (COR-NFTs). If the threat-defense algorithm matches unknown user B to unknown user A who previously failed authentication, then operation 1012 disables the Passport and as necessary deletes the COR and switches future access to COR-NFTs, operation 1014 queries the patient about their safety, and given non-confirmation of patient safety, operation 1016 notifies the Passport Guardian and dispatches local law enforcement and/or emergency responders. And all of the above occur without unauthorized surveillance.

Figure 11:
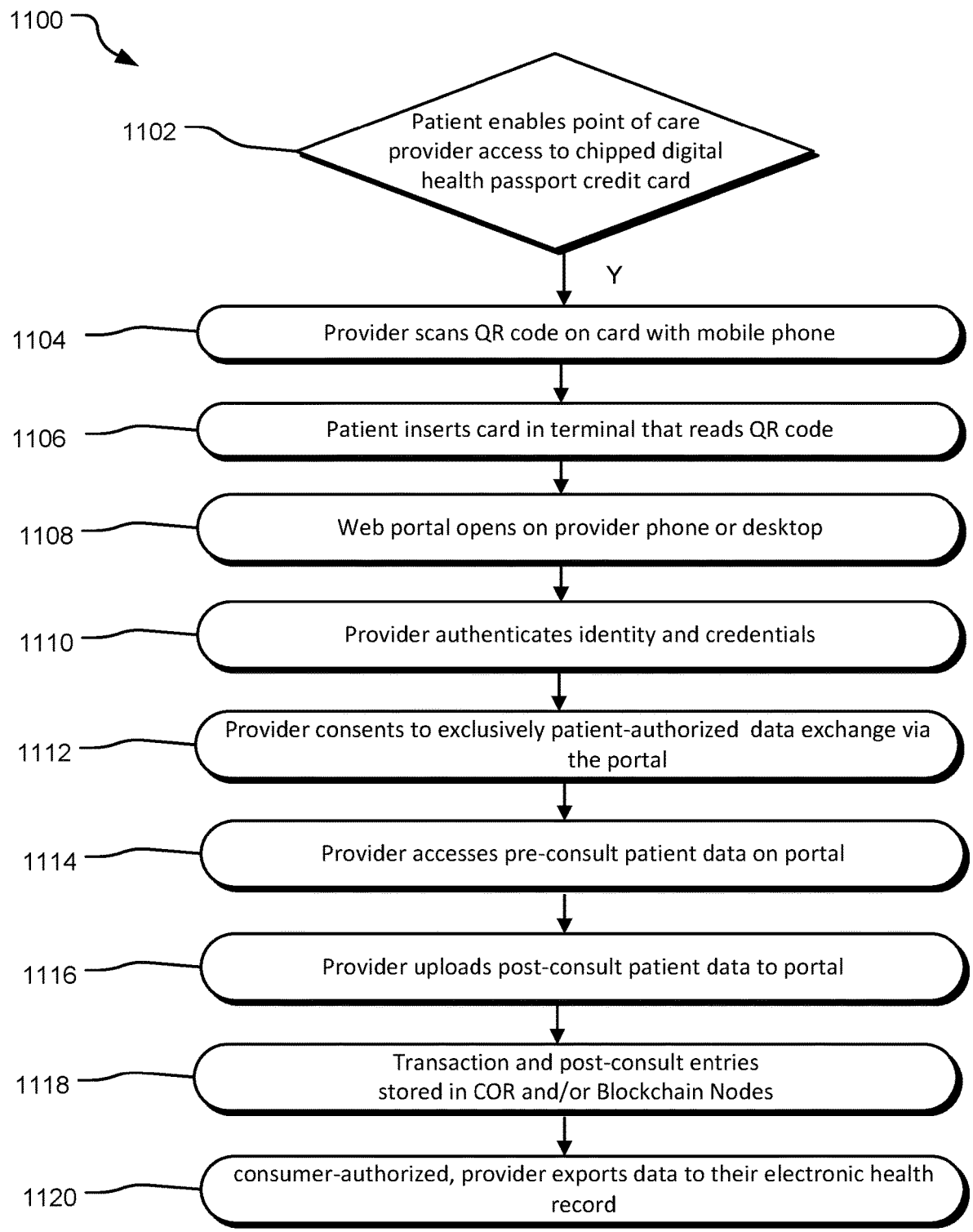
FIG. 11 illustrates example normal mode of operation of a digital health passport using wireless communications tag as disclosed herein.

FIG. 11 illustrates example normal mode of operation of a digital health passport (Passport) using a wireless communication tag as disclosed herein. At operation 1102, the patient enables point of care provider access to the Consumer-Owned Record (COR) by a provider who scans the QR code on a microchipped Passport or inserts the Passport into a credit card terminal, opening a web portal on the provider device 1108, where the provider authenticates identity and credentials 1110, consents to exclusively patient-authorized data exchange 1112, accesses pre-consult patient data 1114, and uploads post-consult patient data 1116. As a result, operation 1118 transaction and post-consult entries in the COR and Blockchain COR-NFTs and operation 1120 facilitates consumer-authorized export of transaction and post-consult entries to the provider' electronic health record system (EHR). And all of the above occur without unauthorized surveillance.

Figure 12:
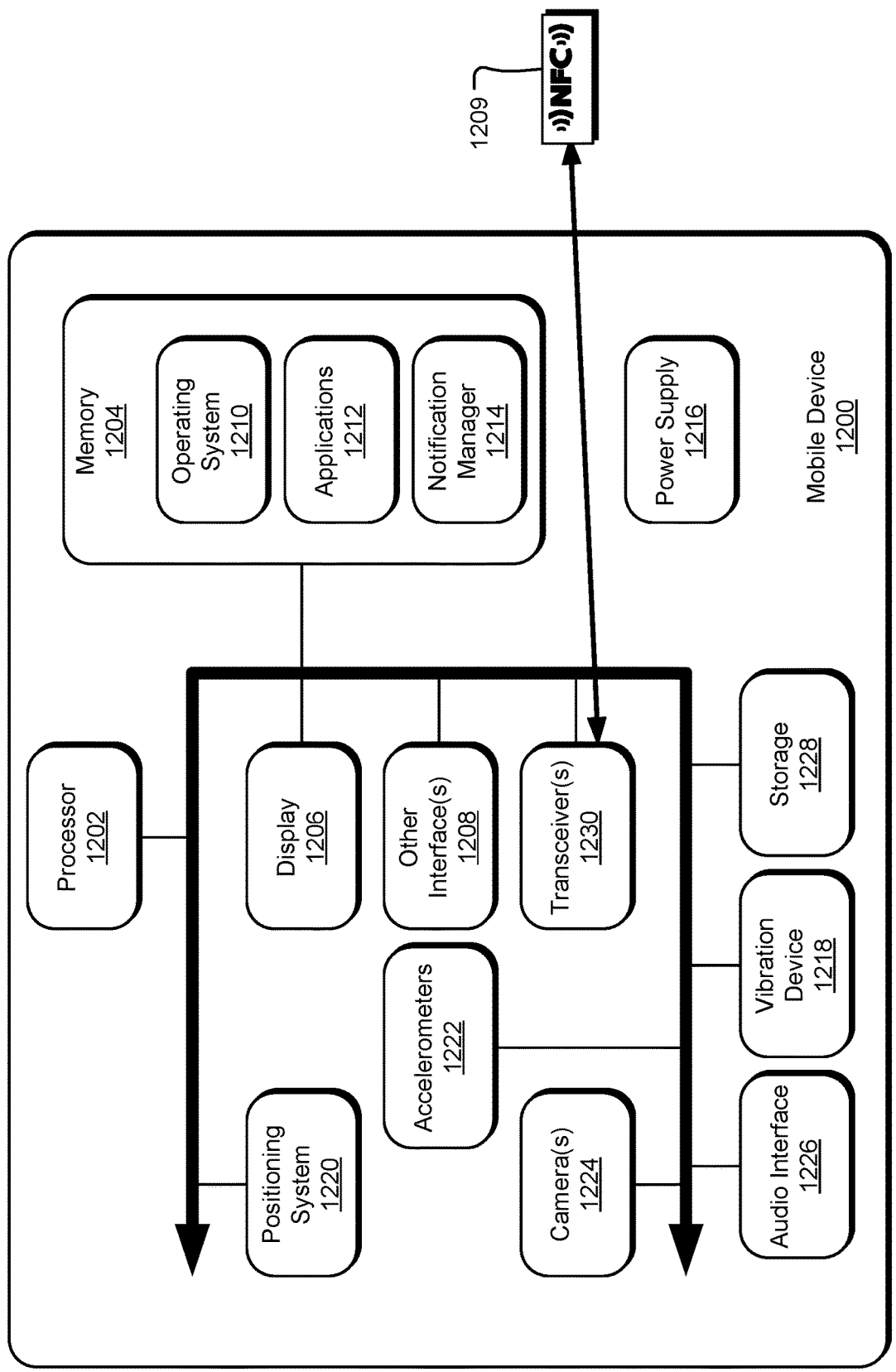
FIG. 12 illustrates a mobile device used to implement one or more components of the system disclosed herein.

FIG. 12 illustrates a mobile device 1200 used to implement one or more components of the system disclosed herein. The mobile device 1200 includes a processor 1202, a memory 1204, a display 1206 (e.g., a touchscreen display), and other interfaces 1208 (e.g., a keyboard). The memory 1204 generally includes both volatile memory (e.g., RAM) and non-volatile memory (e.g., flash memory). An operating system 1210, such as the Microsoft Windows® Phone operating system, resides in the memory 1204 and is executed by the processor 1202, although it should be understood that other operating systems may be employed.

One or more application programs 1212 are loaded in the memory 1204 and executed on the operating system 1210 by the processor 1202. Examples of applications 1212 include without limitation email programs, scheduling programs, personal information managers, Internet browsing programs, multimedia player applications, etc. A notification manager 1214 is also loaded in the memory 1204 and is executed by the processor 1202 to present notifications to the user. For example, when a promotion is triggered and presented to the shopper, the notification manager 1214 can cause the mobile device 1200 to beep or vibrate (via the vibration device 1218) and display the promotion on the display 1206.

The mobile device 1200 includes a power supply 1216, which is powered by one or more batteries or other power sources and which provides power to other components of the mobile device 1200. The power supply 1216 may also be connected to an external power source that overrides or recharges the built-in batteries or other power sources.

The mobile device 1200 includes one or more communication transceivers 1230 to provide network connectivity (e.g., mobile phone network, Wifi®, BlueTooth®, etc.). The transceiver 1230 may be configured to communicate with an NFC tag 1209. The mobile device 1200 also includes various other components, such as a positioning system 1220 (e.g., a global positioning satellite transceiver), one or more accelerometers 1222, one or more cameras 1224, an audio interface 1226 (e.g., a microphone, an audio amplifier and speaker and/or audio jack), and additional storage 1228. Other configurations may also be employed.

In an example implementation, a mobile operating system, various applications, and other modules and services may be embodied by instructions stored in memory 1204 and/or storage devices 1228 and processed by the processing unit 1202. User preferences, service options, and other data may be stored in memory 1204 and/or storage devices 1228 as persistent datastores.

Figure 13:
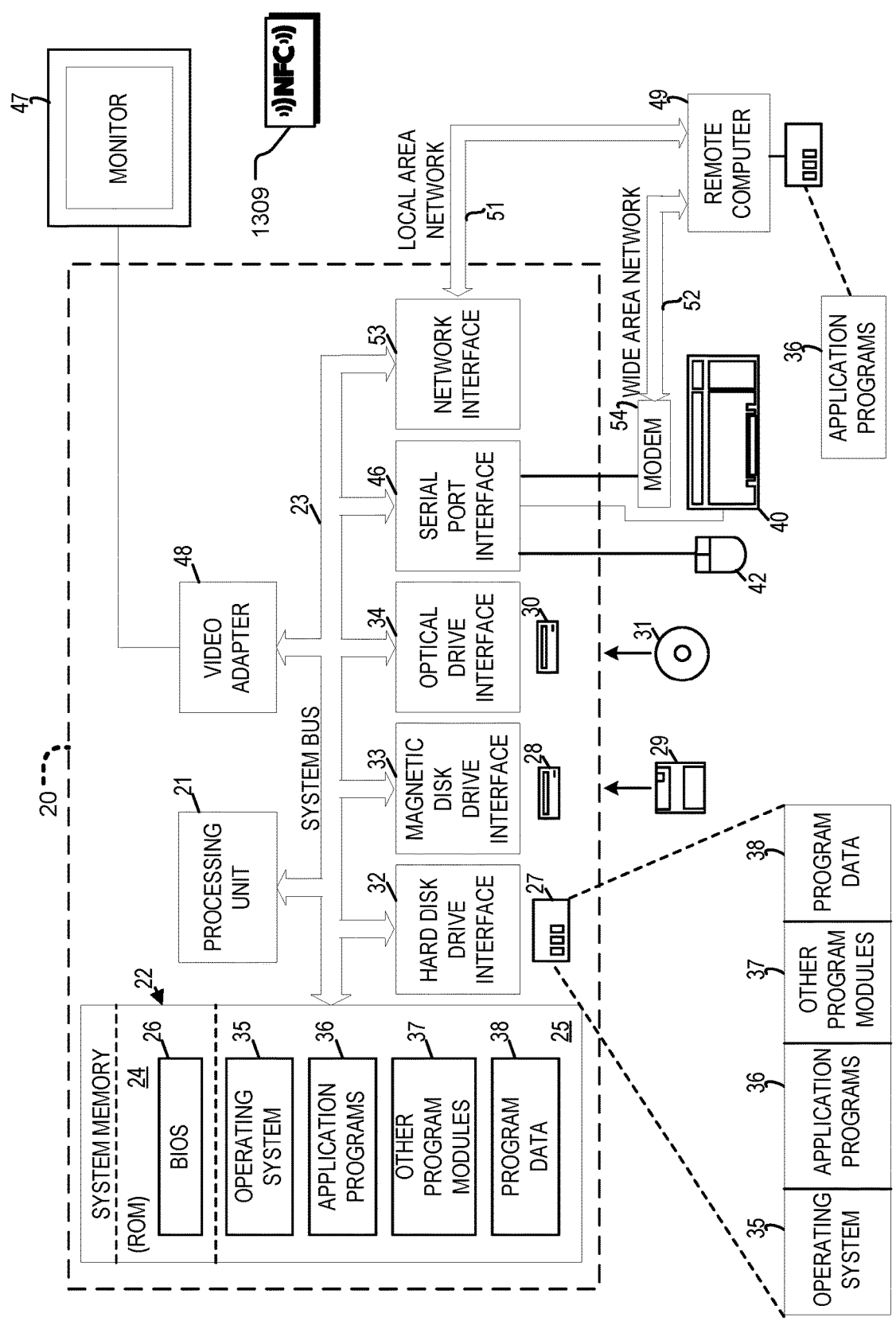
FIG. 13 illustrates an example system that may be useful in implementing the described technology disclosed herein.

FIG. 13 illustrates an example system that may be useful in implementing the described technology. The example hardware and operating environment of FIG. 13 for implementing the described technology includes a computing device, such as general purpose computing device in the form of a gaming console or computer 20, a mobile telephone, a personal data assistant (PDA), a set top box, or other type of computing device. In the implementation of FIG. 13, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20, although only a memory storage device 50 has been illustrated in FIG. 13. The logical connections depicted in FIG. 13 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Figure 14:
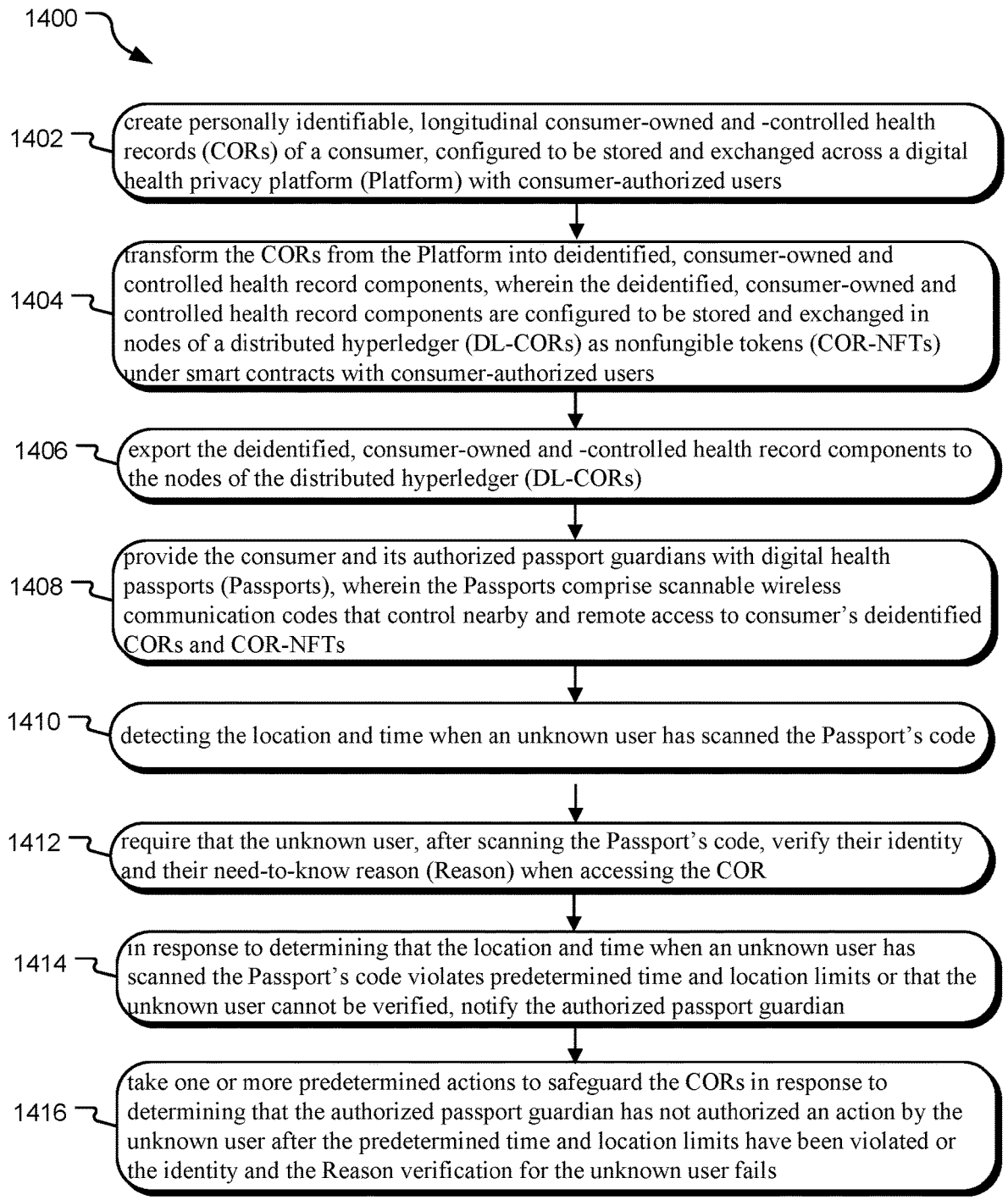
FIG. 14 illustrates alternative example operations of the digital health privacy platform disclosed herein.

FIG. 14 illustrates alternative operations 1400 of the digital health privacy platform disclosed herein. An operation 1402 creates personally identifiable, longitudinal consumer-owned and -controlled health records (CORs) of a consumer, configured to be stored and exchanged across a digital health privacy platform (Platform) with consumer-authorized users. An operation 1404 transforms the CORs from the Platform into deidentified, consumer-owned and -controlled health record components, wherein the deidentified, consumer-owned and -controlled health record components are configured to be stored and exchanged in nodes of a distributed hyperledger (DL-CORs) as nonfungible tokens (COR-NFTs) under smart contracts with consumer-authorized users. An operation 1406 exports the deidentified, consumer-owned and -controlled health record components to the nodes of the distributed hyperledger (DL-CORs). An operation 1408 provides the consumer and its authorized passport guardians with digital health passports (Passports), wherein the Passports comprise scannable wireless communication codes that control nearby and remote access to consumer's deidentified CORs and COR-NFTs. An operation 1410 detects the location and time when an unknown user has scanned the Passport's code. An operation 1412 requires that the unknown user, after scanning the Passport's code, verify their identity and their need-to-know reason (Reason) when accessing the COR. In response to determining that the location and time when an unknown user has scanned the Passport's code violates predetermined time and location limits or that the unknown user cannot be verified, an operation 1414 notifies the authorized passport guardian. An operation 1416 takes one or more predetermined actions to safeguard the CORs in response to determining that the authorized passport guardian has not authorized an action by the unknown user after the predetermined time and location limits have been violated or the identity and the Reason verification for the unknown user fails.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of health records management systems. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application- and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, California, Windows Vista™, Windows NT®, Windows XP PRO, and Windows® 2000, available from Microsoft Corporation of Redmond, Washington, Apple OS X-based systems, available from Apple Inc. of Cupertino, California, or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store," also referred to by the term "repository," describes a hardware and/or software means or apparatus, either local or distributed, for storing digital or analog information or data. The term "data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "data store" also describes, by way of example, databases, file systems, record systems, object oriented databases, relational databases, SQL databases, audit trails and logs, program memory, cache, and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method, comprising:
   creating personally identifiable, longitudinal consumer-owned and -controlled health records (CORs) of a consumer, configured to be stored and exchanged across a digital health privacy platform (Platform) with consumer-authorized users;
   transforming the CORs from the Platform into deidentified, consumer-owned and -controlled health record components, wherein the deidentified, consumer-owned and -controlled health record components are configured to be stored and exchanged in nodes of a distributed hyperledger (DL-CORs) as nonfungible tokens (COR-NFTs) under smart contracts with the consumer-authorized users;

exporting the deidentified, consumer-owned and -controlled health record components to the nodes of the distributed hyperledger (DL-CORs);

providing the consumer and its patient authorized users with digital health passports (Passports), wherein the Passports comprise scannable wireless communication codes that control access to consumer's deidentified CORs and COR-NFTs;

detecting a location and time when an unknown user has scanned the Passport's code;

requiring that the unknown user, after scanning the Passport's code, verify an identity and a need-to-know reason (Reason) of the unknown user when accessing the COR;

in response to determining that the location and time when an unknown user has scanned the Passport's code violates predetermined time and location limits or that the unknown user cannot be verified, notifying the patient authorized user;

taking one or more predetermined actions to safeguard the CORs in response to determining that the patient authorized user has not authorized an action by the unknown user after the predetermined time and location limits have been violated or the identity and the Reason verification for the unknown user fails; and in response to detecting that the unknown user has scanned the Passport's code, outside of the predetermined acceptable time and location range, and without subsequent authorization from the patient authorized user, deleting the COR from the Platform, deactivating the Passport, and restricting access to COR-NFTs by users who have executed smart contracts with the consumer.

2. The method of claim 1, further comprising:
embodying the Passports as mobile apps or microchipped credit cards with scannable wireless communication codes enabling the consumer to exchange health information and pay for healthcare goods and services.

3. The method of claim 2, wherein the scannable wireless communication codes are QR codes.

4. The method of claim 3, further comprising:
in response to detecting that the unknown user has scanned the Passport's code, within a predetermined acceptable time and location range and has successfully verified the identity and the Reason, granting access to Reason-related information in the CORs.

5. The method of claim 4, further comprising: in response to detecting that the unknown user has scanned the Passport's code, within a predetermined acceptable time and location range or with consent of the patient authorized user that overrides these limits, and has successfully verified their identity as a licensed and otherwise qualified healthcare provider and their Reason as responding to requests for care by the consumer or the patient authorized user, granting access to the unknown user to Reason-related information and tools in the CORs through a multi-factor authenticated Platform portal.

6. The method of claim 5, further comprising:
enabling the licensed and otherwise qualified healthcare provider, who has been granted access to Reason-related information and tools in the CORs, to upload digital results of services and to charge for such services, through the multi-factor authenticated Platform portal.

7. The method of claim 5, further comprising: enabling the consumer or the licensed and otherwise qualified healthcare provider that is authorized by a patient authorized user to execute a smart contract for Reason-related access to COR-NFTs.

8. The method of claim 5, further comprising automatically blocking further scanning of the Passports by users whose previous efforts to scan the consumer's Passport has failed identity and Reason verification or whose COR access was previously blocked by the consumer or the patient authorized user.

9. The method of claim 4, further comprising: determining a privacy threat level associated with the CORs of a given user; and in response to determining that the privacy threat level is below a predetermined threshold, activating the Passport's wireless communication code associated with the given user for scanning by unknown users and potential access to the given user's CORs given successful verification of their identity and their Reason.

10. The method of claim 5, further comprising: determining a privacy threat level associated with the CORs of a given user; and in response to determining that the privacy threat level is above a predetermined threshold, disabling the Passport's wireless communication code associated with the given user prohibiting scanning by unknown users and potential access to the given user's CORs; and in response to determining that the privacy threat level is above a threshold threat levels, deleting the CORs of the given user from the Platform, deactivating the given user's Passport, and restricting access to the given user's COR-NFTs to users who have executed smart contracts with the given user.

11. The method of claim 4, further comprising: enabling the consumer or the patient authorized user to execute smart contracts with a plurality of selected users, the plurality of selected users including healthcare providers, to lease access to the consumer's COR-NFTs.

12. The method of claim 10, further comprising: enabling the consumer or the patient authorized user to provide conditional leasing of the consumer's COR-NFTs on payment of specified fees.

13. The method of claim 9, further comprising: enabling the consumer or the patient authorized user to export data in the consumer's COR-NFTs and to restore the data to an identified storage in a COR on the Platform.

14. The method of claim 1,
wherein the CORs are continuously populated with personally identifiable contents of the consumer's many providers' electronic health record systems (EHRs) and wherein the CORs are continuously transformed into deidentified, distributed nonfungible tokens on a hyperledger (COR-NFTs).

15. The method of claim 2, wherein the Passports are microchipped credit card Passports and the method further comprising:
allowing the consumer to use the microchipped credit card Passports to search the Platform's Directory for healthcare goods and services and to purchase such goods and services through the Directory, within predetermined boundaries, with transaction access confined to users with consumer-authorized access to CORs and users with whom consumers have executed smart contracts for COR-NFT access.

16. The method of claim 13, further comprising:
allowing the consumer to authorize interoperability between the CORs and a selected providers' electronic health record systems (EHRs), restricting the CORs to EHR data export to information related to the selected providers' need-to-know, treatment-related Reason, and prohibiting wholesale export of treatment irrelevant transactions, content, or metadata.

17. The method of claim 15, further comprising:
allowing the consumer to search the Platform's Directory for matches with enterprises that will pay the consumer, by direct deposit to the microchipped credit card Passport, to lease valuable COR NFTs, such as radiology images or genomic profiles, without requiring the consumer to relinquish rights of ownership of leased data.

18. The method of claim 14, further comprising:
the consumer exclusively controlling a microchipped credit or debit card Passport, which when swiped by a consumer-authorized provider, informs the provider about preauthorized health insurance plan benefits of the consumer, about billing codes and payment limits for consumer-relevant treatments, supplies downloadable documentation from applicable state-licensed health plans deconflicting state and federal regulations and health plan benefits related to consumer-relevant treatments, so that the consumer may pay in full out of pocket or from pre-approved third party funds for goods and services at the time of in-person or remote encounters.

* * * * *